United States Patent
Inbar et al.

(10) Patent No.: US 11,899,921 B2
(45) Date of Patent: Feb. 13, 2024

(54) SCROLLER INTERFACE FOR TRANSCRIPTION NAVIGATION

(71) Applicant: Google LLC, Mountain View, CA (US)

(72) Inventors: Itay Inbar, Tel-Aviv (IL); Isaac Blankensmith, New York, NY (US); Sherry Lin, Mountain View, CA (US); Thomas Hall, Mountain View, CA (US); James Lemieux, Mountain View, CA (US); Bin Zhang, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/043,701

(22) PCT Filed: Sep. 28, 2021

(86) PCT No.: PCT/US2021/071613
§ 371 (c)(1),
(2) Date: Mar. 1, 2023

(87) PCT Pub. No.: WO2022/072992
PCT Pub. Date: Apr. 7, 2022

(65) Prior Publication Data
US 2023/0266874 A1    Aug. 24, 2023

Related U.S. Application Data

(60) Provisional application No. 63/084,800, filed on Sep. 29, 2020.

(51) Int. Cl.
*G06F 3/04855* (2022.01)
*G06F 3/04842* (2022.01)

(52) U.S. Cl.
CPC ...... *G06F 3/04855* (2013.01); *G06F 3/04842* (2013.01)

(58) Field of Classification Search
CPC .............. G06F 3/04855; G06F 3/04842
See application file for complete search history.

(56) References Cited

U.S. PATENT DOCUMENTS

2003/0093790 A1* 5/2003 Logan ................ G06F 16/7867
348/E7.071
2012/0079372 A1* 3/2012 Kandekar ............ G06F 40/258
715/256

(Continued)

*Primary Examiner* — Asher D Kells
(74) *Attorney, Agent, or Firm* — McDonnell Boehnen Hulbert & Berghoff LLP

(57) ABSTRACT

A method includes receiving, at a computing device, a transcription of an audio recording, where the transcription is divided into a plurality of text sections. The method additionally includes associating one or more tags with each text section of the plurality of text sections, where each associated tag is extracted from text of the transcription. The method also includes selecting a subset of the plurality of text sections based at least on the one or more tags associated with each text section of the plurality of text sections. The method further includes providing, for display on the computing device, a representation of the transcription and a scroller interface, where the scroller interface allows for navigation to each text section in the subset based on user navigation to a tag associated with the text section.

20 Claims, 8 Drawing Sheets

(56) References Cited

U.S. PATENT DOCUMENTS

2012/0087637 A1* 4/2012 Logan .............. H04N 21/25891
386/241
2019/0121532 A1 4/2019 Strader et al.
2019/0180175 A1 6/2019 Metter et al.

* cited by examiner

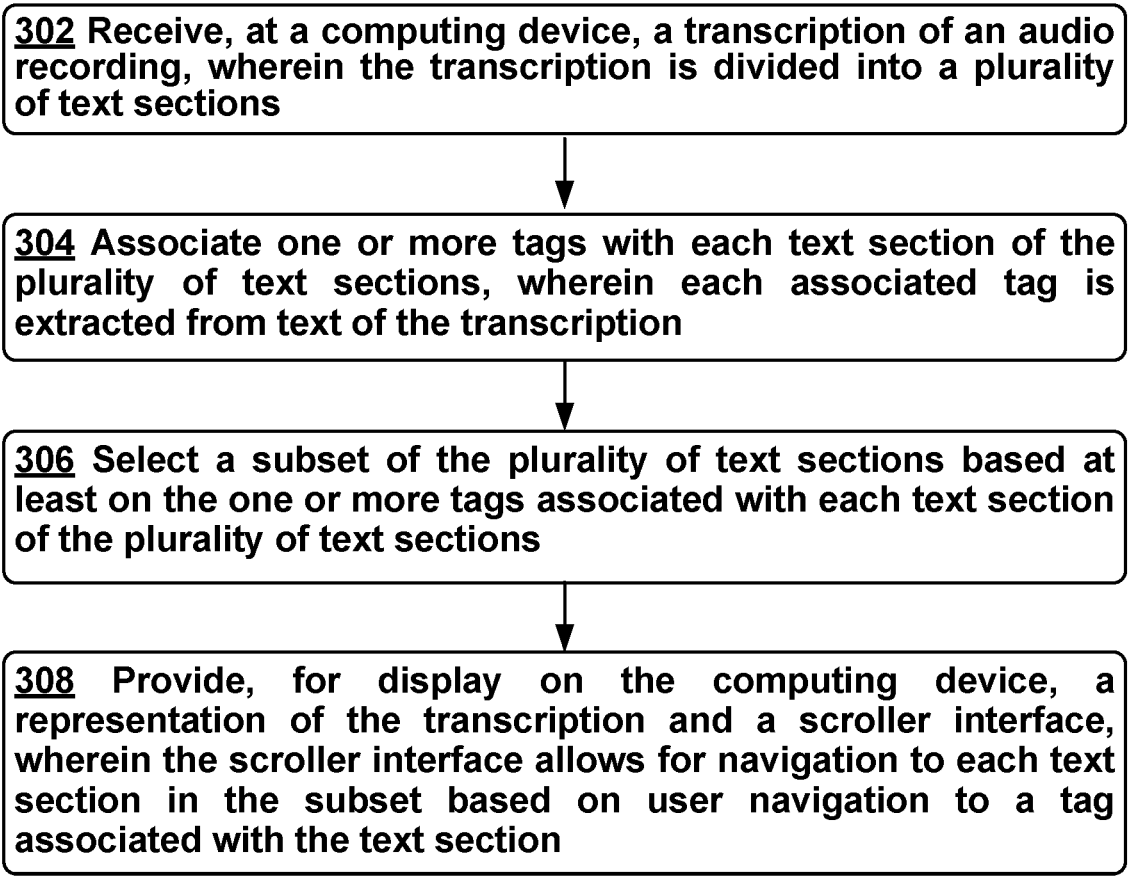

302 Receive, at a computing device, a transcription of an audio recording, wherein the transcription is divided into a plurality of text sections 304 Associate one or more tags with each text section of the plurality of text sections, wherein each associated tag is extracted from text of the transcription 306 Select a subset of the plurality of text sections based at least on the one or more tags associated with each text section of the plurality of text sections 308 Provide, for display on the computing device, a representation of the transcription and a scroller interface, wherein the scroller interface allows for navigation to each text section in the subset based on user navigation to a tag associated with the text section

FIG. 3

SCROLLER INTERFACE FOR TRANSCRIPTION NAVIGATION

CROSS-REFERENCE TO RELATED APPLICATIONS

This present application is a national stage application under 35 U.S.C. § 371 of International Application No. PCT/US2021/071613, filed on Sep. 28, 2021, which claims priority to U.S. Patent Application No. 63/084,800, filed on Sep. 29, 2020, the content of which are incorporated by reference in their entirety.

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

One such application program may cause the computing device to record audio content, such as spoken words. The application program may then display a transcription of the recorded audio content to allow a user to view a textual representation of the spoken words. The application program may include a GUI that allows for user navigation of the transcription.

SUMMARY

The present disclosure includes systems and methods that provide a scroller interface to facilitate user navigation of a transcription of recorded audio content.

In a first aspect, a method is provided. The method includes receiving, at a computing device, a transcription of an audio recording, where the transcription is divided into a plurality of text sections. The method additionally includes associating one or more tags with each text section of the plurality of text sections, where each associated tag is extracted from text of the transcription. The method also includes selecting a subset of the plurality of text sections based at least on the one or more tags associated with each text section of the plurality of text sections. The method additionally includes providing, for display on the computing device, a representation of the transcription and a scroller interface, where the scroller interface allows for navigation to each text section in the subset based on user navigation to a tag associated with the text section.

In a second aspect, a computing device is provided. The computing device includes one or more processors and a non-transitory computer readable medium comprising program instructions executable by the one or more processors to perform functions. The functions include receiving a transcription of an audio recording, where the transcription is divided into a plurality of text sections. The functions additionally include associating one or more tags with each text section of the plurality of text sections, where each associated tag is extracted from text of the transcription. The functions also include selecting a subset of the plurality of text sections based at least on the one or more tags associated with each text section of the plurality of text sections. The functions additionally include providing, for display on the computing device, a representation of the transcription and a scroller interface, where the scroller interface allows for navigation to each text section in the subset based on user navigation to a tag associated with the text section.

In a third aspect, a non-transitory computer-readable medium is provided including program instructions executable by one or more processors to cause the one or more processors to perform functions. The functions include receiving a transcription of an audio recording, where the transcription is divided into a plurality of text sections. The functions additionally include associating one or more tags with each text section of the plurality of text sections, where each associated tag is extracted from text of the transcription. The functions also include selecting a subset of the plurality of text sections based at least on the one or more tags associated with each text section of the plurality of text sections. The functions additionally include providing, for display on the computing device, a representation of the transcription and a scroller interface, where the scroller interface allows for navigation to each text section in the subset based on user navigation to a tag associated with the text section.

In a fourth aspect, a system is provided that includes means for receiving a transcription of an audio recording, where the transcription is divided into a plurality of text sections. The system additionally includes means for associating one or more tags with each text section of the plurality of text sections, where each associated tag is extracted from text of the transcription. The system also includes means for selecting a subset of the plurality of text sections based at least on the one or more tags associated with each text section of the plurality of text sections. The system additionally includes means for providing, for display on the computing device, a representation of the transcription and a scroller interface, where the scroller interface allows for navigation to each text section in the subset based on user navigation to a tag associated with the text section.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 3 is a block diagram of a method, in accordance with example embodiments.

DETAILED DESCRIPTION

Figure 1A:
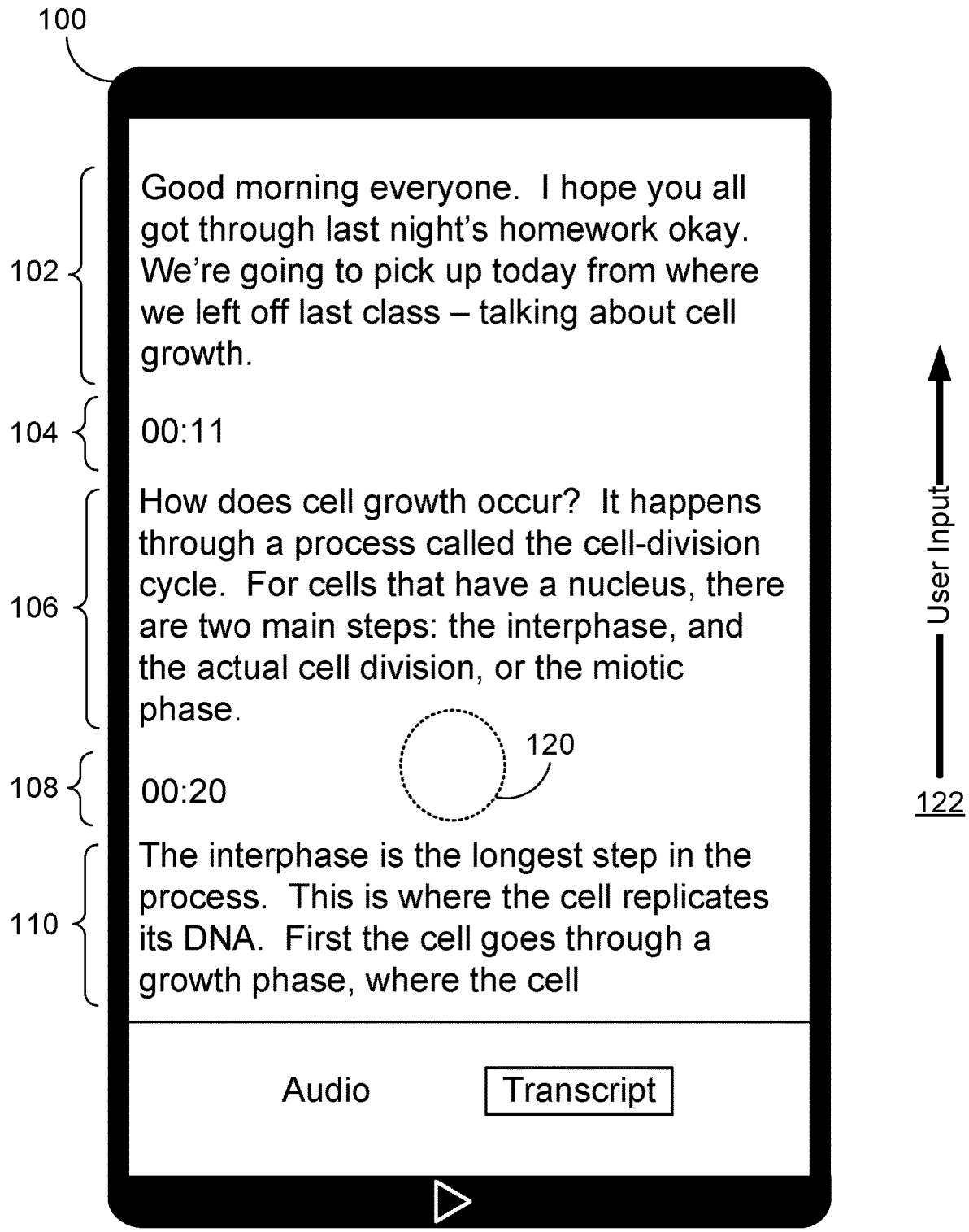
FIGS. 1A, 1B, 1C, 1D, and 1E illustrate a sequence of views of a GUI of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

A software application may be programmed to record audio content, such as conversations between people. The application may provide a transcription of recorded words and an interface to display the transcription to a user, such as the user of a mobile device. In some cases, a recorder application of this type may record long conversations, leading to very long transcriptions (e.g., an hour-long conversation spanning many pages of text). In some such cases, a user may struggle to find important sections of a transcription when attempting to navigate through many pages of text. In some examples described herein, particularly informative sections in the text may be flagged or highlighted to facilitate user navigation. In addition, a particularly informative keyword from each such section may be extracted based on the section content and associated to the section to further facilitate user navigation and reduce the amount of time needed to navigate to a desired section of the overall transcription.

A transcription may initially be divided into sections based on a transcription model which takes the entire transcription as input and which outputs section divisions between different text sections. One or more section selector models may then be applied to the sections to identify the most significant sections for understanding of the entire text. For each such significant section, a tag may be attributed to the section that best describes the text of that section. Each tag may be a single word or multiple consecutive words extracted from a text section that best explains what the section is about and how the section is unique in regards to the entire content of text. The tags may allow for easy user navigation (e.g., scrolling) to navigate to important sections of the text that discuss topics described by the associated tags.

In some examples, both the highlighting of important sections and the identification of keywords in those sections to serve as tags may be performed in the context of the overall transcription. For example, a text section of a transcription may describe both the National Basketball Association (NBA) and Lebron James. Thus, both "NBA" and "Lebron" could potentially serve as tags for the section. However, the overall text of the transcription may include many references to the NBA, but other sections may not contain references to Lebron James. Accordingly, "Lebron" may be identified as the section tag because the text section is specifically focused on Lebron James. In this manner, tags may be extracted with a contextual understanding of the overall text to highlight the uniqueness of associated text sections, in terms of what that section adds to the full transcription.

One or more separate models may be used to attribute tags to associated sections. In some examples, results from two different models may be combined to identify which tags belong to which section. A first such model may be a deep learning model which is trained on user data to understand the text and find important tags in the text. For instance, the first model may be a deep learning natural language processing (NLP) model, such as Bidirectional Encoder Representations from Transformers (BERT). A second model may be a heuristic or algorithmic model rather than a machine learning model. For instance, the second model may be a term frequency—inverse document frequency (TF-IDF) model which considers extracted potential tags, and counts the number of times each potential tag appears in each section. Separate weights may be applied to the results of the machine learning model (e.g., weighting a score of a tag in the context of the overall text) and to the results of the algorithmic model (e.g., weighting a score of a tag based on occurrences). A two-model approach may be advantageous because each model may have separate tag identification abilities. An algorithmic tag-based selector may be well equipped to find general terms which occur often, but may not work as well to identify specific terms. A machine learning model may be better equipped to find specific terms, but may also sometimes identify specific terms that are clearly erroneous. Combining both approaches (a model prone to general terms and a model prone to specific terms) may provide the best of both worlds. After aggregating the results of both models, only tags with high scores from both models may be selected so that each model provides a check on the other model.

In some examples, only nouns may be extracted as tags. A separate noun extractor model may be used to separate out other parts of speech. Based on feedback from users, nouns have been identified as more useful tags than other parts of speech such as adjectives and verbs for some example applications. In further examples, in order to find occurrence counts of tags, linguistic stemming may be applied to each tag so that different forms of tags may all be counted as occurrences. For instance, the same occurrence count may be applied for singular nouns, plural nouns, and possessive nouns (e.g., apple, apples, apple's).

The result of application of one or more tag attribution models may be a list of one or more tags attributed to each section. In some examples, tag attribution may be performed in parallel with text section selection (while identifying tags for text sections, it may not be known which text sections will be selected). In further examples, the list of tags for each section may be ranked in order or otherwise scored to allow for later display of a top tag for each selected section. Duplicate tags may also be filtered out to avoid associating the same tag to different sections. Each text section may therefore be provided with a distinct associated tag.

Identification of important text sections to highlight may also be performed with one or more models. In some examples, results may be combined from a first model and a second model. The first model may be a machine learning model (e.g., a deep learning model trained to understand grammar and context). The second model may be an algorithmic model (e.g., a tag-based model configured to take all tags which appear in each section and summarize those tags). The results (e.g., scores) from each model may be normalized and a predefined weighting scheme may be applied to aggregate the results. The output of this tag selection process may be a section relevance score for each text section of the transcription (apart from the separately generated tag relevance scores for all the tags appearing in each section). Similar to the tag selection process, a combination of different approaches (e.g., a machine learning model and an algorithmic model) may provide better results than either model in isolation.

Ultimately, a subset of the text sections of the transcription may be selected to use as part of a smart scroller user interface. In order to optimize the user experience, text sections identified as important which also have an associated tag that has been identified as important may be prioritized. Text sections identified as important which do not have a good associated tag option may not be selected because tags will be displayed as part of the resulting user interface. Text sections may therefore be identified by balancing both the relevance scores of the text sections and the relevance scores of the associated tags. In some examples, a predetermined number of text sections may always be selected for the user interface. For instance, eight text sections may be selected to display as part of a scroller interface. In further examples, even distribution filtering may be applied to penalize scores of sections that are too close to each other in the overall transcription. More navigational value may be obtained by not highlighting neighboring sections.

II. EXAMPLE GUIS

A GUI may be provided as part of a scroller interface to facilitate user navigation of text. In some examples, the user interface includes a graphical panel that appears once the user starts scrolling through the text, signifying that the user is skimming or searching through the text. The user interface may surface a scroll bar on the right, and present the marked areas and tags when the user scrolls through these areas. As a more specific example, the user interface may include two parts: (1) a grey timeline, which represents a global overview of the entire transcript, and (2) a blue bubble, which acts as a magnifying glass for the text that is currently visible on the screen. In some examples, the number of sections to show on screen in the grey timeline may be limited regardless of the text size. For instance, this number may be a maximum of eight to ten sections. The GUI may vary in appearance from the examples specifically illustrated and described herein.

FIGS. 1A, 1B, 1C, 1D, and 1E illustrate a sequence of views of a GUI of a computing device, in accordance with example embodiments. More specifically, computing device 100 is illustrated as a mobile phone or tablet device with a display showing portions of a transcription of an audio recording. The GUI additionally includes user interface elements to facilitate user navigation to different portions of the transcription.

FIG. 1A illustrates an initial view of a portion of the transcription on the display of computing device 100. The transcription is divided into discrete text sections. In this case each discrete text section is represented as a paragraph. In alternative examples, different divisions for the discrete text sections may be used instead (e.g., sentences or pages). In reference to FIG. 1A, three text sections are shown on the display of computing device 100: text section 102, text section 106, and text section 110. In addition, timestamps 104 and 108 are displayed to indicate the starting times in the transcription of corresponding text sections.

FIG. 1A additionally shows that a user has selected "Transcript" to switch to a user interface mode in which a text representation of an audio recording is displayed. In the illustrated example, an "Audio" mode is also available to allow the user to instead navigate to different portions of the audio recording for playback. The view illustrated in FIG. 1A may represent user navigation of a transcription in real time (e.g., during or shortly after an audio recording). The view illustrated in FIG. 1A may also represent user navigation through a transcription at a later point in time after the recording. In this example, the audio recording relates to a professor teaching a biology class. Accordingly, the user interface and associated software application may be used by a student to navigate to different portions of a transcription of the class recording after class. The example illustrated is a typical case where a user interface that allows for efficient navigation may be particularly beneficial. For instance, the student may record an entire class session, but only need to review particular sections at a later time. The software application may therefore provide a beneficial alternative to playing back the entire audio recording of the class session.

In order to navigate through the transcription, the user may touch a touchscreen interface of computing device 100 at touch area 120 on the display. The user may then move his or her finger upward as illustrated by user input 122. This upward motion may initiate a downward scrolling of the text displayed on the screen. Conversely, a downward motion may initiate an upward scrolling of the text displayed on the screen. In alternative examples, different types of user input and/or different types of user input devices may be used to allow for scrolling of the text displayed on the screen of computing device 100.

Figure 1B:
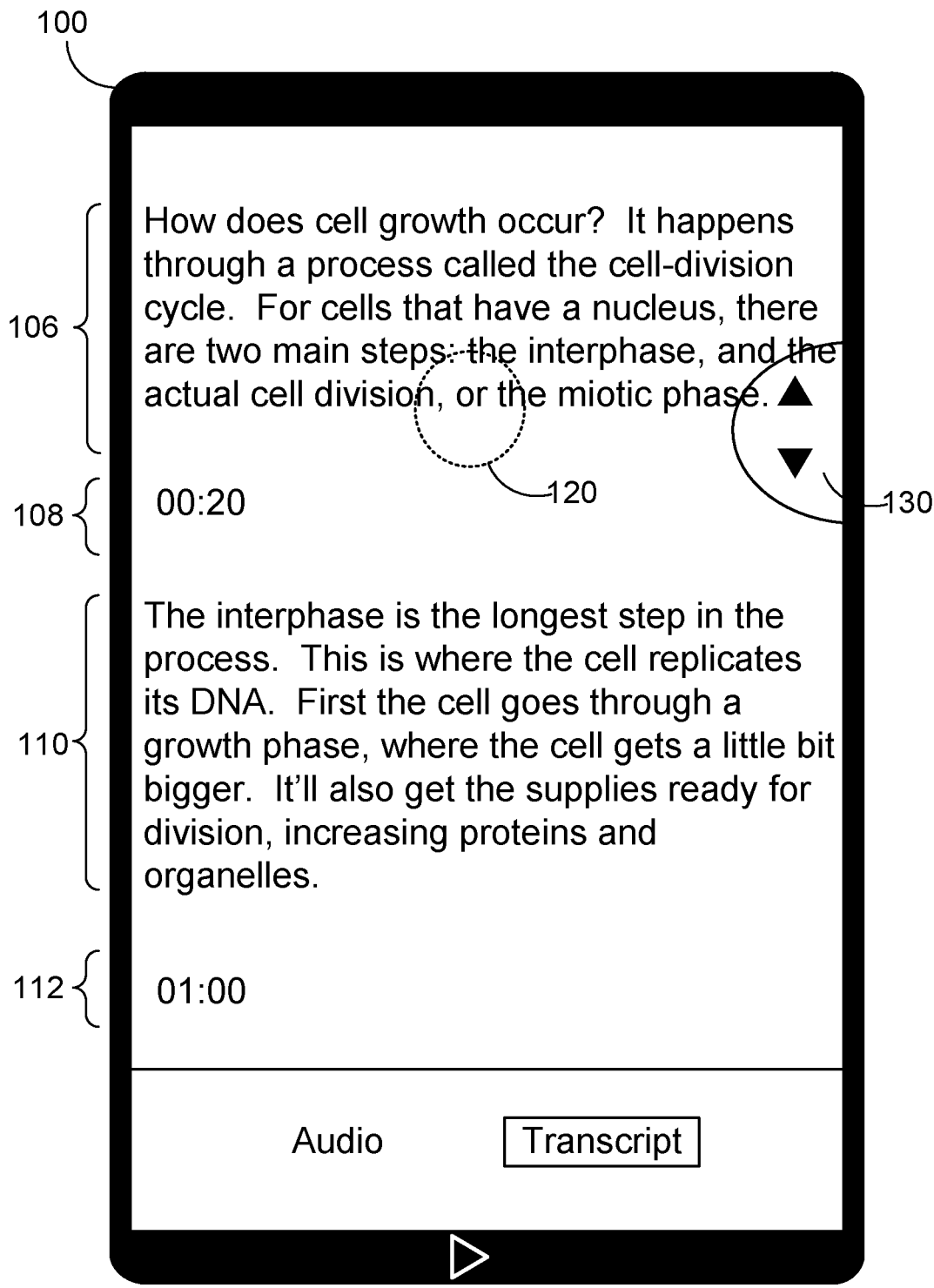

FIG. 1B illustrates a subsequent view of the display of computing device 100 after the user input illustrated in FIG. 1A. In FIG. 1B, touch area 120 is illustrated further up the screen on computing device 100 to illustrate the upward motion of the user's finger. The transcription is scrolled to show a textual representation of a later portion of the audio recording. Accordingly, text sections 106 and 110 are now shown on the screen along with timestamps 108 and 112. FIG. 1B therefore illustrates the result of manual navigation through the transcription. The example transcription illustrated in FIGS. 1A-1E is only a few minutes long. However, in practice, transcriptions may be generated for much longer audio recordings (e.g., an hour or more). In such cases, manual navigation by traditional scrolling may be highly inefficient for a user.

FIG. 1B additionally illustrates interface element 130 which is displayed in response to the motion of the user's finger indicated by touch area 120. In this case, the upward motion of the user's finger indicates a desire to navigate through the text of the transcription (e.g., to find a particular portion of a class lecture). Accordingly, interface element 130 is displayed to provide the user with a selectable option to initiate a separate smart scroller interface. In this example, the up and down arrows of interface element 130 are provided to help illustrate the significance of interface element 130. In other examples, a different type of interface element may be displayed. In yet other examples, no interface element may be displayed, and instead a full smart scroller interface may be displayed in response to the user's initial scrolling input. In yet further examples, a user may be provided alternative interface means to cause the computing device 100 to display a smart scroller interface as well or instead.

Figure 1C:
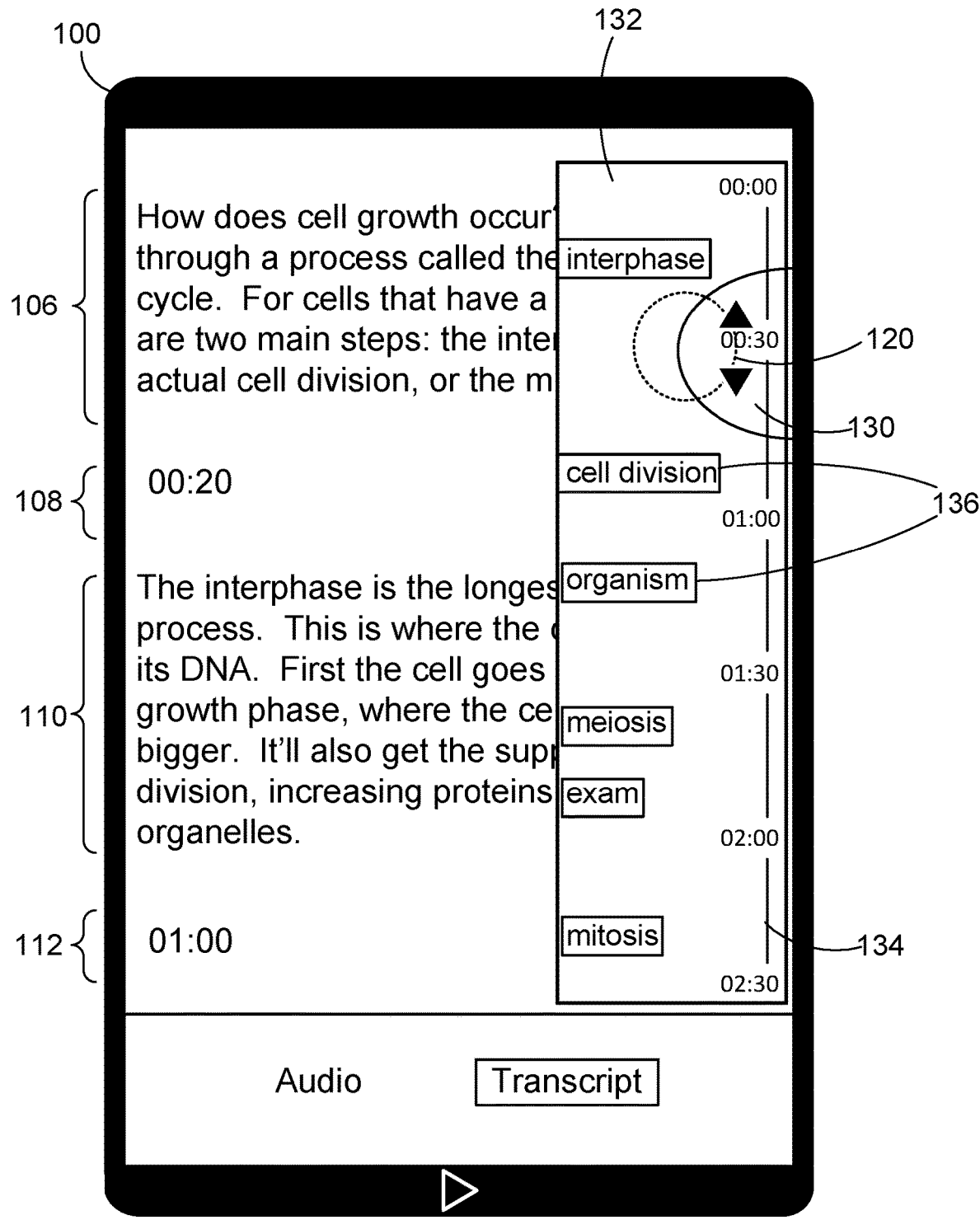

FIG. 1C additionally illustrates interface panel 132 which is displayed in response to user input selecting interface element 130. Touch area 120 indicates a user touch input to select interface element 130. Panel 132 is then displayed which includes timeline 134 which illustrates the entire length of the transcription. In addition, panel 132 also includes tags 136 associated with different selected text sections from the transcription. Both section relevance and tag relevance may be considered in the context of the entire transcription to determine which sections to select for inclusion within the smart scroller interface and which tag to display for each selected section. More details are provided regarding the section and tag selection process in the description regarding the example architecture displayed in FIG. 2. Panel 132 and included user interface components provide a user with an alternative means to quickly navigate to different portions of the overall transcription.

In some examples, a predetermined number of text sections may always be selected for inclusion in the smart scroller interface. In an example illustrated in FIG. 1C, six tags are extracted from corresponding text sections of the transcription. In this case, the tags 136 are: "interphase", "cell division", "organism", "meiosis", "exam", and "mitosis." Each of the tags 136 provides a contextualized indicator of the relevance of corresponding selected sections of the transcription to facilitate user navigation via interaction with the smart scroller interface. In some examples such as illustrated here, nouns may be chosen for all of the tags 136. In alternative examples, different types of tags may be extracted as well or instead.

Figure 1D:
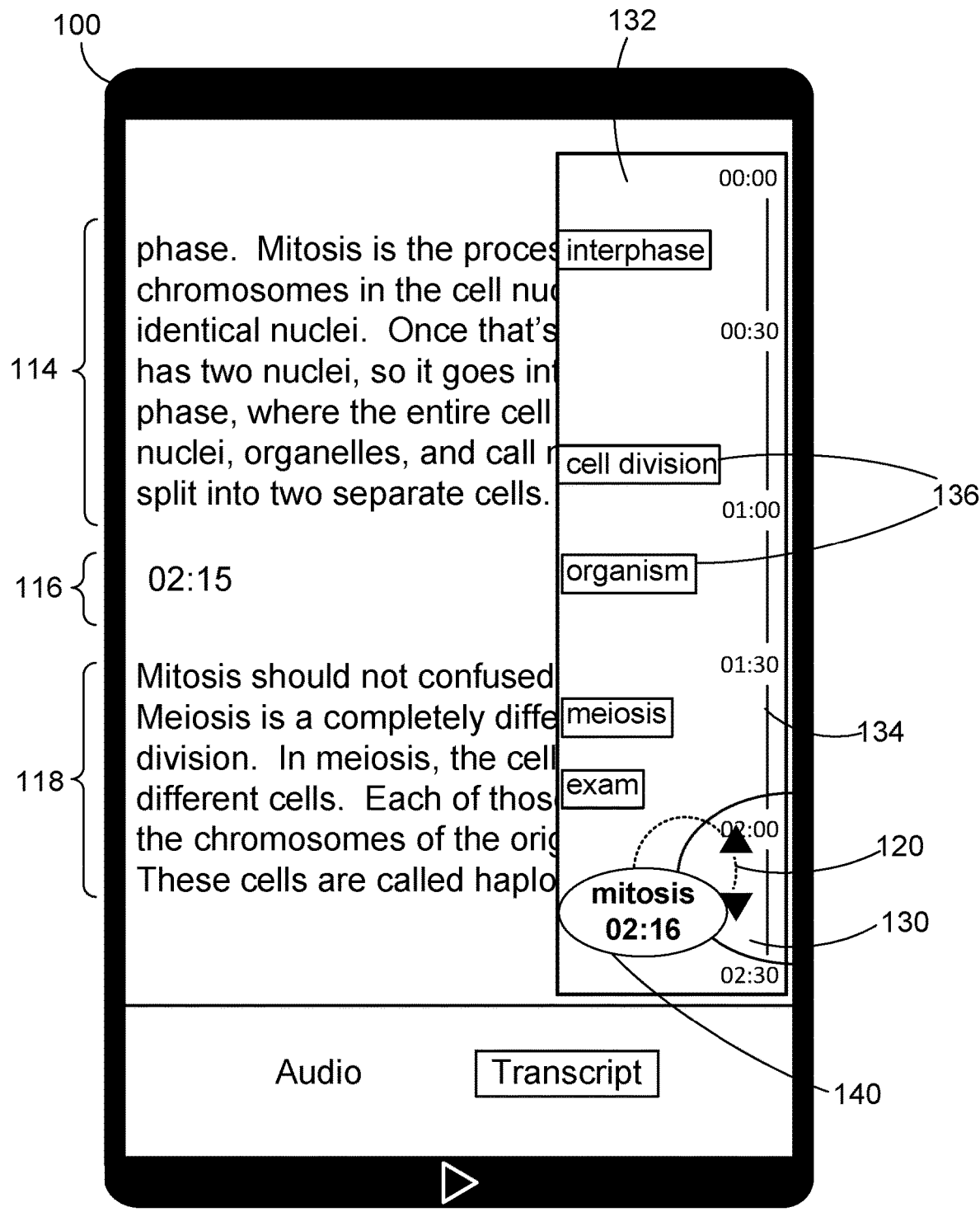

FIG. 1D illustrates navigation to a different portion of the transcription in response to user input navigating within the smart scroller interface. More specifically, the user may choose to navigate to a particular one of the tags 136 in order to navigate to a different section of the transcription. The manner in which navigation to a particular tag within a smart scroller interface is performed may vary in different examples. In some examples, the interface may allow the user to drag interface element 130 to a different portion of timeline 134 and/or touch the timeline 134 directly to move the interface element 130 to a different portion of the timeline 134. In the illustrated example, the location of touch area 120 illustrates the user navigation to the tag "mitosis" near the end of the transcription. Highlighted bubble 140 illustrates that the user has navigated to "mitosis" and the highlighted bubble 140 also displays a corresponding timestamp ("02:16") at which the text section corresponding to the tag "mitosis" begins in the audio recording. In further examples, the interface may allow a user to directly select particular tags to navigate to corresponding sections in the transcription as well or instead.

As a result of user interaction with panel 132, a different portion of the transcription is displayed on computing device 100. In particular, text sections 114 and 118 are displayed, along with timestamp 116. In this example, text section 118 corresponds to the tag "mitosis" and begins at 02:16 of the audio recording. The user input provided to panel 132 therefore indicates an interest in reviewing portions of the class session relating specifically to mitosis. Alternative sections of the transcription correspond to the other tags 136 that are available within panel 132 for user navigation.

The GUI representing the smart scroller interface may be different in other examples. For instance, in some examples, only the tags may be displayed for selection without a timeline. The tags may also be displayed in a different format, such as a dropdown list as well or instead. In other examples, only proximate tags to a current navigational position in the transcription may be displayed as the user navigates up and down through a timeline. Regardless, the interface may allow for quick navigation to sections of the transcription identified as highly relevant based on tags identified as highly relevant in the context of the overall transcription.

Figure 1E:
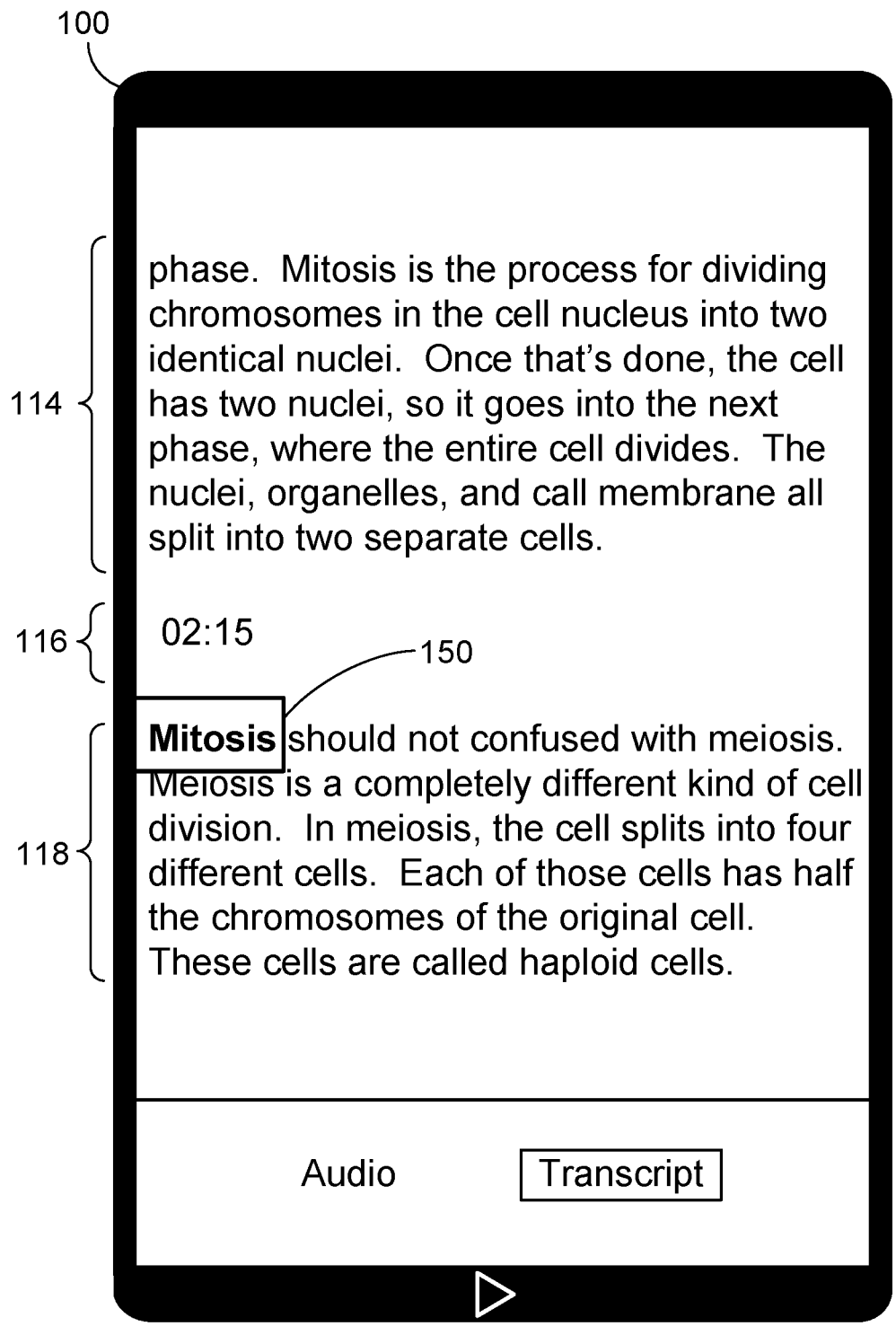

FIG. 1E illustrates the resulting display of a chosen portion of the transcription based on user interaction with the smart scroller interface. In particular, text section 118 is now fully visible on the display screen of computing device 100 based on user navigation to the tag "mitosis." In some examples such as illustrated here, the interface may enable the user to choose to view the text section corresponding to a particular tag by removing the touch input after navigating to the particular tag. The panel 132 may be removed in response to the user input to allow full viewing of the chosen portion of the transcription. In further examples, after the panel 132 has been removed, one or more occurrences of the tag within the text section may be temporarily highlighted to signify the effect of the user input. For instance, in reference to FIG. 1E, highlighted block 150 highlights the occurrence of "mitosis" within text section 118 to help the user understand that he or she has navigated to a portion of the transcription identified as being particularly relevant for its description of mitosis in the context of the overall transcription.

To repeat the process, the user may provide additional touch input to the display of computing device 100 to again enter the smart scroller interface. From there, the user may choose to navigate to a different tag to view a different associated text section. In this manner, the user's experience in navigating through the text of a transcription may be improved compared to interfaces that allow only for manual scrolling up and down.

III. EXAMPLE ARCHITECTURE

Figure 2:
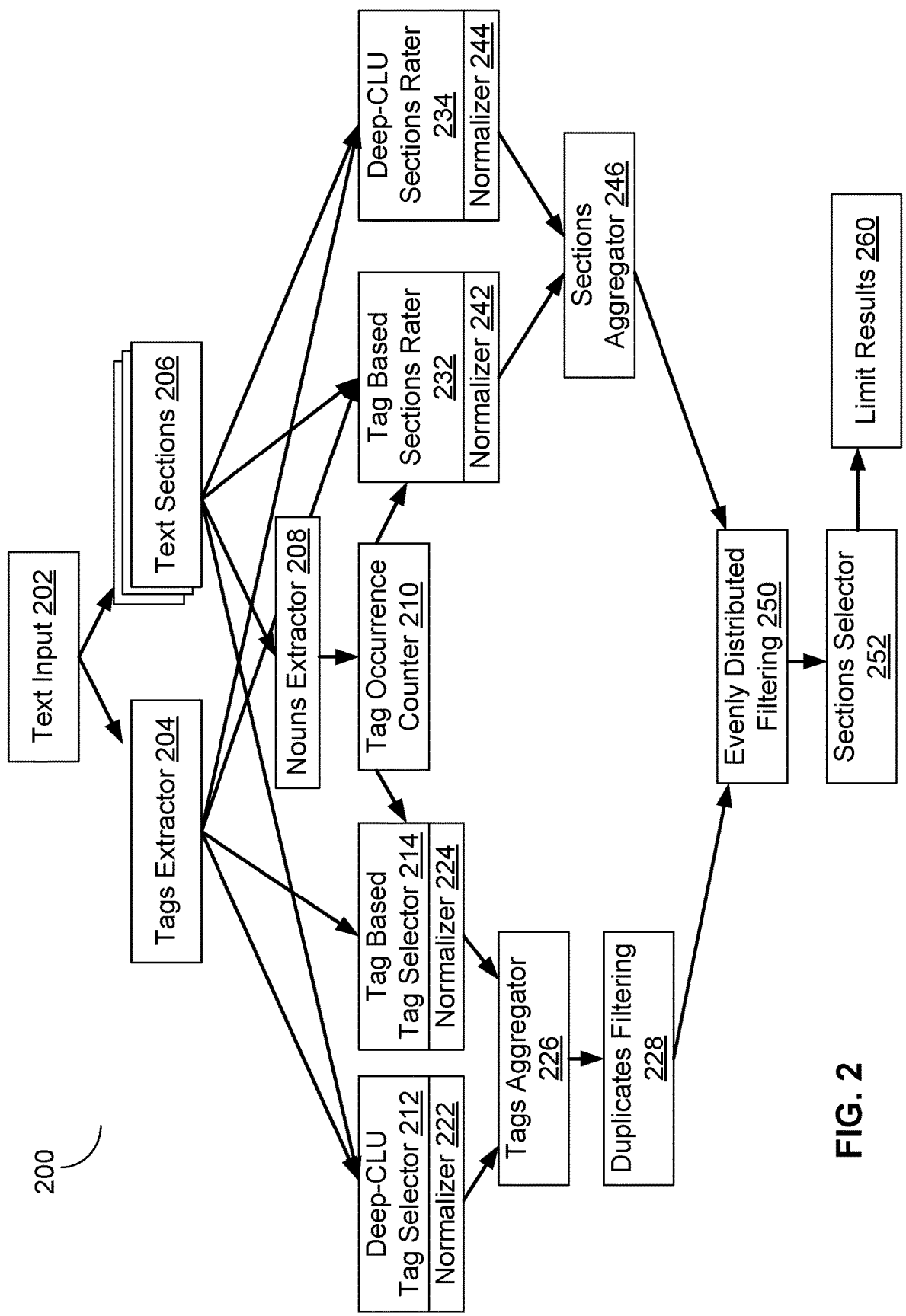
FIG. 2 is a block diagram of a system architecture, in accordance with example embodiments.

FIG. 2 is a block diagram of a system architecture, in accordance with example embodiments. More specifically, FIG. 2 illustrates an example architecture 200 (arrangement of software modules) that may operate on provided inputs to generate outputs that enable operation of the smart scroller interfaces described herein. The arrangement of FIG. 2 is provided for purposes of illustration. Alternative examples may include fewer modules, additional modules, and/or modules arranged or combined in different ways than explicitly illustrated in FIG. 2.

Text Input 202 may be provided in the form of a transcription of an audio recording for processing by the modules illustrated in FIG. 2. In some examples, the same computing device may generate Text Input 202 from an audio recording and process Text Input 202 using architecture 200. In other embodiments, a first computing device may generate Text Input 202 from an audio recording and a second computing device may process Text Input 202 using architecture 200. For instance, the first computing device may be a mobile user device and the second computing device may be a remote server.

FIG. 2 will be described in the context of processing Text Input 202 in the form of a transcription of an audio recording. However, it is noted that the methodology illustrated and described with respect to FIG. 2 as well as the other Figures included herein is equally applicable to other types of text input. For instance, the methodology may also be applied to generate a smart scroller interface for navigating books (e.g., for an e-reader), web pages (e.g., for a web browser), or news stories (for a news viewer), among other possible applications.

Tags Extractor 204 is a module applied to Text Input 202 in order to produce candidate or potential tags from the transcription. These candidate tags may later be evaluated during the tag selection process and the text section selection process for purposes of determining which tags to include in a smart scroller interface. Tags Extractor 204 may be a machine learning model trained based on user data to find important words over the entire text of the transcription.

Text Sections 206 are also generated based on Text Input 202. In some examples, Text Sections 206 may be provided as part of the input along with Text Input 202 to a computing device using architecture 200. In other examples, the computing device may process Text Input 202 directly to divide the Text Input 202 into the discrete sections that make up Text Sections 206. Each of Text Sections 206 may be identified to be a separate paragraph or other block of text within the overall transcription. In some examples, a machine learning model, an algorithmic model, or a combination of both may be used to find appropriate dividing points between consecutive portions of a transcription to generate Text Sections 206.

Both Text Sections 206 and the tags produced by Tags Extractor 204 may be input into Nouns Extractor 208, which is a module configured to filter the tags to include only nouns. In some examples, Nouns Extractor 208 may be a machine learning module such as a neural network trained for part of speech tagging. In further examples, Nouns Extractor 208 may apply linguistic stemming heuristics so that different forms of a noun are counted as the same potential tag (including singular, plural, possessive, etc.). The output from Nouns Extractor 208 may be input into Tag Occurrence Counter 210, which is a module configured to count occurrences of all forms of potential tags. The resulting output of Nouns Extractor 208 and Tag Occurrence Counter 210 includes potential noun tags and associated occurrence counts, which may be used as input to drive both the tag selection and section selection process.

Deep-conversation language understanding (CLU) Tag Selector 212 is a machine learning language model that is trained based on user data to understand grammar and context in order to score and/or rank potential tags for each section. In some examples, Deep-CLU Tag Selector 212 is a BERT-based recurrent neural network (RNN) model. Deep-CLU Tag Selector 212 takes as input Text Sections 206 as well as the potential tags from Tag Extractor 204 in order to score and/or rank the potential tags for each section. The output from Deep-CLU Tag Selector 212 is a scoring and/or ranking which is then input into Normalizer 222. Normalizer 222 is a module which adjusts scoring and/or ranking of tags in order to enable aggregation of scores and/or rankings of tags output by multiple different models (e.g., a machine learning model and an algorithmic model).

Tag Based Tag Selector 214 is an algorithmic or heuristic model that scores and/or ranks tags from the potential tags generated by Tag Extractor 204. In some examples, Tag Based Tag Selector 214 may be a TF-IDF model with curve fitting. A TF-IDF model is based on a numerical statistic that is intended to reflect how important a word is to a document in a collection or corpus. The TF-IDF value increases proportionally to the number of times a word appears in the document and is offset by the number of documents in the corpus that contain the word, which helps to adjust for the fact that some words appear more frequently in general. In some examples, Tag Based Tag Selector 214 operates by scoring and/or ranking the potential tags in each section based on occurrence counting information from Tag Occurrence Counter 210. The output of Tag Based Tag Selector 214 is input into Normalizer 224. Similar to Normalizer 222, Normalizer 224 is a module which adjusts scoring and/or ranking of tags in order to enable aggregation of scores and/or rankings of tags output by multiple different models.

Tags Aggregator 226 is a module which takes as input the output scores and/or rankings of tags from both Normalizer 222 and Normalizer 224. In some examples, aggregating the results of multiple models may produce better results. Tags Aggregator 226 applies a weighted averaging of the outputs from the multiple different models. In some examples, the weighted averaging is based on predetermined weights. In other examples, some or all of the weights may periodically be adjusted. The output of Tags Aggregator 226 is input into Duplicates Filtering 228. Duplicates Filtering 228 is a module which removes duplicated tags so that a distinct tag is chosen for each section.

The resulting output of the tag aggregation process (the output after application of Duplicates Filtering 228 to the output of Tags Aggregator 226) is a distinct highest-ranking tag for each text section (without knowledge at this point of which particular text sections will be selected for the smart scroller interface). In some examples, the output of the tag aggregation process is instead a ranking of multiple tags for each of the text sections (e.g., ranked from most relevant to least relevant).

Turning now to the section selection process, Tag Based Sections Rater 232 is an algorithmic or heuristic module that scores and/or ranks the text sections by evaluating and summarizing all the potential tags contained therein. Tag Based Sections Rater 232 takes as input Text Sections 206, the potential tags from Tags Extractor 204, and the occurrence information from Tag Occurrence Counter 210. The scores and/or ranking of text sections output by Tag Based Sections Rater 232 may be input into Normalizer 242. Normalizer 242 is a module which adjusts scoring and/or ranking of text sections in order to enable aggregation of scores and/or rankings of text sections output by multiple different models (e.g., a machine learning model and an algorithmic model).

Deep-CLU Sections Rater 234 is a machine learning language model that is trained based on user data to understand grammar and context in order to score and/or rank the text sections. In some examples, Deep-CLU Sections Rater 234 is a BERT-based RNN model. Deep-CLU Sections Rater 234 takes as input Text Sections 206 as well as the potential tags from Tag Extractor 204 in order to score and/or rank the text sections. The output from Deep-CLU Sections Rater 234 is a scoring and/or ranking of text sections which is then input into Normalizer 244. Similar to Normalizer 242, Normalizer 244 is a module which adjusts scoring and/or ranking in order to enable aggregation of scores and/or rankings of sections output by multiple different models (e.g., a machine learning model and an algorithmic model).

Sections Aggregator 246 is a module which takes as input the output scores and/or rankings of text sections from both Normalizer 242 and Normalizer 244. In some examples, aggregating the results of multiple models may produce better results. Sections Aggregator 246 applies a weighted averaging of the outputs from the multiple different models. In some examples, the weighted averaging is based on predetermined weights. In other examples, some or all of the weights may periodically be adjusted. The output of Sections Aggregator 246 is a scoring and/or ranking of the text sections.

In some examples, both section relevance scores for each of the text sections and tag relevance scores for each of the tags in each section may be considered when selecting a subset of the text sections to show as part of a smart scroller interface. Even Distribution Filtering 250 is a module that may first be applied to penalize the scores of sections that are close together (e.g., adjacent) in the overall transcription. Sections Selector 252 is a module which then performs the section selection process based on the tag scoring and/or ranking information from Tags Aggregator 226 and the text section scoring and/or ranking information from Sections Aggregator 246.

The output of Sections Selector 252 is Limit Results 260, a subset of best performing text sections based on all of the scoring information, with each section having a best performing tag for display within a smart scroller interface. In some examples, Section Selector 252 always chooses Limit Results 260 to have a predetermined number of best performing sections (e.g., the top eight sections). In other examples, the number of text sections chosen by Sections Selector 252 to use for the smart scroller interface may be adjusted based on one or more factors, such as user preference and/or transcription length.

For any of the machine learning based modules illustrated in FIG. 2, user data may first be collected and used for training purposes. More specifically, users may be asked to review transcriptions of audio recordings to highlight important sections in order to train a model for section selection. Users may also be asked to choose a word that best describes the importance of each section in the context of the overall transcription in order to train a model for tag selection. Other types of user feedback data may also be used to train one or more of the described machine learning models as well or instead.

IV. EXAMPLE METHODS

FIG. 3 illustrates a method 300, in accordance with example embodiments. The blocks of method 300 represent functions, operations, or steps which may be carried out by one or more computing devices. The blocks of method 300 may be executed by a mobile computing device such as computing device 100 as illustrated and described in reference to FIGS. 1A-1E or by a different computing device. Furthermore, method 300 may be performed by a computing device configured with any or all of the components of the architecture illustrated in FIG. 2. In further examples, some or all of the blocks of method 300 may be carried out by a remote computing device or split across multiple computing devices.

With respect to any of the ladder diagrams, scenarios, and flow charts illustrated in FIG. 3 and the other Figures, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a computer program, a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

In reference to FIG. 3, block 302 includes receiving, at a computing device, a transcription of an audio recording. The transcription may be divided into a plurality of text sections. In some examples, the transcription and section divisions may be received from a transcription software program or module running on the computing device. The software program or module may be configured to process recorded audio data to generate the transcription. In other examples, the transcription and section divisions may be received from a separate computing device.

Block 304 includes associating one or more tags with each text section of the plurality of text sections. Each associated tag may be extracted from text of the transcription.

In some examples, associating tags with text sections may involve aggregating results from application of a first model and a second model. The first model may be an algorithmic model. The second model may be a machine learning model. In further examples, this aggregating may involve assigning scores to tags by applying a first predetermined weight to the results from application of the first model and a second predetermined weight to the results from application of the second model. In further examples, the machine learning model may be trained to identify contextually relevant tags by taking the transcription as input.

In additional examples, associating the tags may involve determining an occurrence count of potential tags in each text section. In further examples, linguistic stemming may be applied before determining the occurrence count of potential tags in each text section.

In further examples, a nouns extractor may be applied to the text of the transcription so that each tag is guaranteed to be a noun. In additional examples, duplicate filtering may be applied to potential tags so that each tag is guaranteed to be distinct.

Block 306 includes selecting a subset of the plurality of text sections based on at least on the one or more tags associated with each text section of the plurality of text sections. The subset of text sections may be selected to be informative sections in the context of the overall transcription. The associated tags may be considered in the text section selection process in view of the ultimate user interface result which includes display of an informative tag associated with each selected text section.

In some examples, selecting the subset of text sections involves aggregating results from application of a first model and a second model. The first model may be an algorithmic model. The second model may be a machine learning model. In further examples, this aggregating may involve assigning scores to text sections by applying a first predetermined weight to the results from application of the first model and a second predetermined weight to the results from application of the second model. In additional examples, the algorithmic model may be configured to assign scores to text sections based on extracted tags from the transcription.

Additional examples may include assigning a section relevance score to each text section of the plurality of text sections and assigning a tag relevance score to each tag associated with each text section of the plurality of text sections. Selecting the subset may then be based on the section relevance score assigned to each text section and the tag relevance score assigned to each tag associated with each text section.

In further examples, selecting the subset of text sections may involve applying even distribution filtering across the plurality of text sections. In additional examples, the subset of text sections may be selected to include a predetermined number of text sections (e.g., eight text sections).

Block 308 includes providing, for display on the computing device, a representation of the transcription and a scroller interface. The scroller interface may allow for navigation to each text section in the subset based on user navigation to a tag associated with the text section.

In some examples, a ranking of the tags associated with each text section may be determined. The ranking may be based on estimated relevance of each of the tags for the text section in the context of the overall transcription. Each tag displayed in the scroller interface may then be a highest-ranked tag for an associated text section.

In further examples, the scroller interface may include a scrollbar with an annotation displayed for each tag associated with a text section of the subset. In such examples, the annotation displayed for each tag may be positioned relative to the scrollbar based on a timestamp of the text section associated with the tag. Further examples may involve highlighting text corresponding to a tag in the representation of the transcription in response to user navigation to the tag in the scroller interface. The scroller interface may be varied in a number of other ways.

V. EXAMPLE DEVICES

Figure 4:
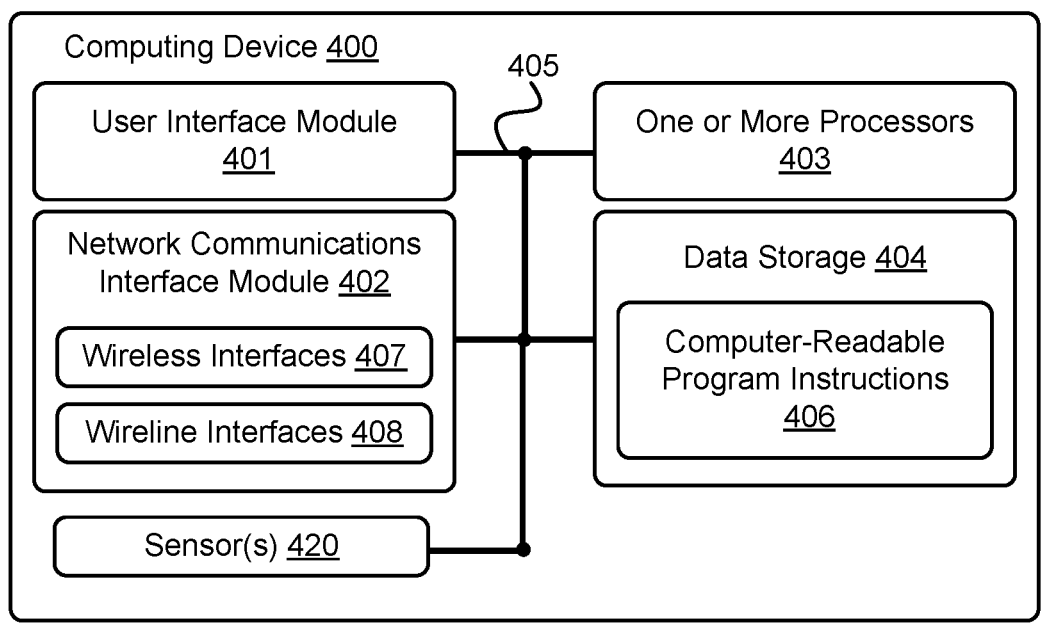
FIG. 4 is a functional block diagram of a computing device, in accordance with example embodiments.

FIG. 4 is a functional block diagram of an example computing device 400, in accordance with an example embodiment. In some examples, computing device 400 shown in FIG. 4 can be configured to perform at least one function described in relation to computing device 100 illustrated in FIGS. 1A-1E, at least one function described in relation to architecture 200 illustrated in FIG. 2, and/or at least one function described in relation to method 300 illustrated in FIG. 3.

Computing device 400 may include a user interface module 401, a network communication interface module 402, one or more processors 403, data storage 404, and one or more sensors 420, all of which may be linked together via a system bus, network, or other connection mechanism 405.

User interface module 401 can be operable to send data to and/or receive data from external user input/output devices. For example, user interface module 401 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 401 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 401 can also be configured to generate audible outputs, such as a speaker, speaker jack, audio output port, audio output device, earphones, and/or other similar devices. User interface module 401 can further be configured with one or more haptic devices that can generate haptic outputs, such as vibrations and/or other outputs detectable by touch and/or physical contact with computing device 400. In some embodiments, user interface module 401 can be used to provide a graphical user interface (GUI) for utilizing computing device 400.

Network communications interface module 402 can include one or more wireless interfaces 407 and/or one or more wireline interfaces 408 that are configurable to communicate via a network. Wireless interfaces 407 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 408 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 402 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation headers and/or footers, size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 403 can include one or more general purpose processors, and/or one or more special purpose processors (e.g., digital signal processors, graphics processing units, application specific integrated circuits, etc.). One or more processors 403 can be configured to execute computer-readable program instructions 406 that are contained in data storage 404 and/or other instructions as described herein.

Data storage 404 can include one or more computer-readable storage media that can be read and/or accessed by at least one of one or more processors 403. The one or more computer-readable storage media can include volatile and/or non-volatile storage components, such as optical, magnetic, organic or other memory or disc storage, which can be integrated in whole or in part with at least one of one or more processors 403. In some embodiments, data storage 404 can be implemented using a single physical device (e.g., one optical, magnetic, organic or other memory or disc storage unit), while in other embodiments, data storage 404 can be implemented using two or more physical devices.

Data storage 404 can include computer-readable program instructions 406 and perhaps additional data. In some embodiments, data storage 404 can additionally include storage required to perform at least part of the herein-described methods, scenarios, and techniques and/or at least part of the functionality of the herein-described devices and networks.

In some embodiments, computing device 400 can include one or more sensors 420. Sensors 420 can be configured to measure interactions with computing device 400 by a user. Sensors 420 can also be configured to measure conditions in an environment of computing device 400 and provide data about that environment. For example, sensors 420 can include one or more of: (i) an identification sensor to identify other objects and/or devices, such as, but not limited to, a Radio Frequency Identification (RFID) reader, a proximity sensor, a one-dimensional barcode reader, a two-dimensional barcode (e.g., Quick Response (QR) code) reader, and a laser tracker, where the identification sensor can be configured to read identifiers, such as RFID tags, barcodes, QR codes, and/or other devices and/or object configured to be read and provide at least identifying information; (ii) a sensor to measure locations and/or movements of computing device 400, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 400, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 400, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 420 are possible as well.

With respect to any examples described herein that may involve recorded audio data or other information from a user, a user may be provided with controls allowing the user to make an election as to both if and when systems, programs, or features described herein may enable collection and/or storing of recorded audio data or other information (e.g., information about a user's social network, social actions, or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, as well as what information is provided to the user.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   receiving, at a computing device, a transcription of an audio recording, wherein the transcription is divided into a plurality of text sections;
   associating one or more tags with each text section of the plurality of text sections, wherein each associated tag is extracted from text of the transcription;
   selecting a subset of the plurality of text sections based at least on the one or more tags associated with each text section of the plurality of text sections; and
   providing, for display on the computing device, a representation of the transcription and a scroller interface, wherein the scroller interface allows for navigation to each text section in the subset based on user navigation to a tag associated with the text section.

2. The method of claim 1, further comprising determining, for each text section of the plurality of text sections, a ranking of the one or more tags associated with the text section, wherein each tag displayed in the scroller interface is a highest-ranked tag for an associated text section.

3. The method of claim 1, wherein associating the one or more tags with each text section of the plurality of text sections comprises aggregating results from application of a first model and a second model, wherein the first model is an algorithmic model, and wherein the second model is a machine learning model.

4. The method of claim 3, wherein aggregating the results from application of the first model and the second model comprises assigning scores to tags by applying a first predetermined weight to the results from application of the first model and by applying a second predetermined weight to the results from application of the second model.

5. The method of claim 3, wherein the machine learning model is configured to identify contextually relevant tags by taking the transcription as input.

6. The method of claim 1, wherein associating the one or more tags with each text section of the plurality of text sections comprises determining an occurrence count of potential tags in each text section of the plurality of text sections.

7. The method of claim 6, further comprising applying linguistic stemming before determining the occurrence count of potential tags in each text section of the plurality of text sections.

8. The method of claim 1, further comprising applying a nouns extractor to the text of the transcription, such that each tag displayed in the scroller interface is a noun.

9. The method of claim 1, further comprising applying duplicate filtering to potential tags, such that each tag displayed in the scroller interface is distinct.

10. The method of claim 1, wherein selecting the subset of the plurality of text sections comprises aggregating results from application of a first model and a second model, wherein the first model is an algorithmic model, and wherein the second model is a machine learning model.

11. The method of claim 10, wherein aggregating the results from application of the first model and the second model comprises assigning scores to sections by applying a first predetermined weight to the results from application of the first model and by applying a second predetermined weight to the results from application of the second model.

12. The method of claim 10, wherein the algorithmic model is configured to assign scores to sections based on extracted tags from the transcription.

13. The method of claim 1, further comprising:
assigning a section relevance score to each text section of the plurality of text sections;
assigning a tag relevance score to each tag associated with each text section of the plurality of text sections; and
wherein selecting the subset is based on the section relevance score assigned to each text section of the plurality of text sections and the tag relevance score assigned to each tag associated with each text section of the plurality of text sections.

14. The method of claim 1, wherein selecting the subset comprises applying even distribution filtering across the plurality of text sections.

15. The method of claim 1, wherein the subset comprises a predetermined number of text sections.

16. The method of claim 1, wherein the scroller interface comprises a scrollbar with an annotation displayed for each tag associated with a text section of the subset.

17. The method of claim 16, wherein the annotation displayed for each tag is positioned relative to the scrollbar based on a timestamp of the text section associated with the tag.

18. The method of claim 1, further comprising in response to user navigation to a particular tag, highlighting text corresponding to the particular tag in the representation of the transcription.

19. A computing device comprising:
one or more processors; and
a non-transitory computer readable medium comprising program instructions executable by the one or more processors to perform functions comprising:
receiving a transcription of an audio recording, wherein the transcription is divided into a plurality of text sections;
associating one or more tags with each text section of the plurality of text sections, wherein each associated tag is extracted from text of the transcription;
selecting a subset of the plurality of text sections based at least on the one or more tags associated with each text section of the plurality of text sections; and
providing, for display on the computing device, a representation of the transcription and a scroller interface, wherein the scroller interface allows for navigation to each text section in the subset based on user navigation to a tag associated with the text section.

20. A non-transitory computer readable medium comprising program instructions executable by one or more processors to perform functions comprising:
receiving a transcription of an audio recording, wherein the transcription is divided into a plurality of text sections;
associating one or more tags with each text section of the plurality of text sections, wherein each associated tag is extracted from text of the transcription;
selecting a subset of the plurality of text sections based at least on the one or more tags associated with each text section of the plurality of text sections; and
providing, for display, a representation of the transcription and a scroller interface, wherein the scroller interface allows for navigation to each text section in the subset based on user navigation to a tag associated with the text section.

* * * * *